United States Patent [19]

Doucette

[11] Patent Number: 5,038,516

[45] Date of Patent: Aug. 13, 1991

[54] RODENT POISON DISPENSER

[76] Inventor: Carl Doucette, 536 Arena St., El Segundo, Calif. 90245

[21] Appl. No.: 632,314

[22] Filed: Dec. 21, 1990

Related U.S. Application Data

[63] Continuation of Ser. No. 496,425, Mar. 20, 1990, abandoned.

[51] Int. Cl.$^5$ ............................................ A01M 25/00
[52] U.S. Cl. ...................................................... 43/131
[58] Field of Search ........................................ 43/131

[56]  References Cited

U.S. PATENT DOCUMENTS

| | | | |
|---|---|---|---|
| 2,568,168 | 9/1951 | Query | 43/131 |
| 2,635,382 | 4/1953 | Kuntz | 43/131 |
| 2,664,663 | 1/1954 | Mullen | 43/131 |
| 2,944,364 | 7/1960 | Kelly | 43/131 |
| 3,122,857 | 3/1964 | Yates | 43/131 |
| 4,026,064 | 5/1977 | Baker | 43/131 |
| 4,208,829 | 1/1980 | Manning | 43/131 |
| 4,400,904 | 8/1983 | Baker | 43/131 |
| 4,825,581 | 5/1989 | Dailey | 43/131 |
| 4,835,902 | 6/1989 | Sherman | 43/131 |

Primary Examiner—Richard K. Seidel
Assistant Examiner—Chuck Y. Mah
Attorney, Agent, or Firm—Beehler & Pavitt

[57]  ABSTRACT

A rodent poison dispenser is constructed of a housing preferably having a pair of openings spaced from each other at the bottom of the housing and providing a pathway for a rodent between said openings. Along said pathway and easily accessible therefrom by a rodent is a first feeding trough for a dry poison food and a separate second feeding trough for a liquid poison. Means are provided to dispense into each trough and to maintain at an attractive level for rodent feeding, the type of poison substance carried in the trough. The housing may be secured to a structure on the ground and locked to prevent undesired access or tampering.

1 Claim, 3 Drawing Sheets

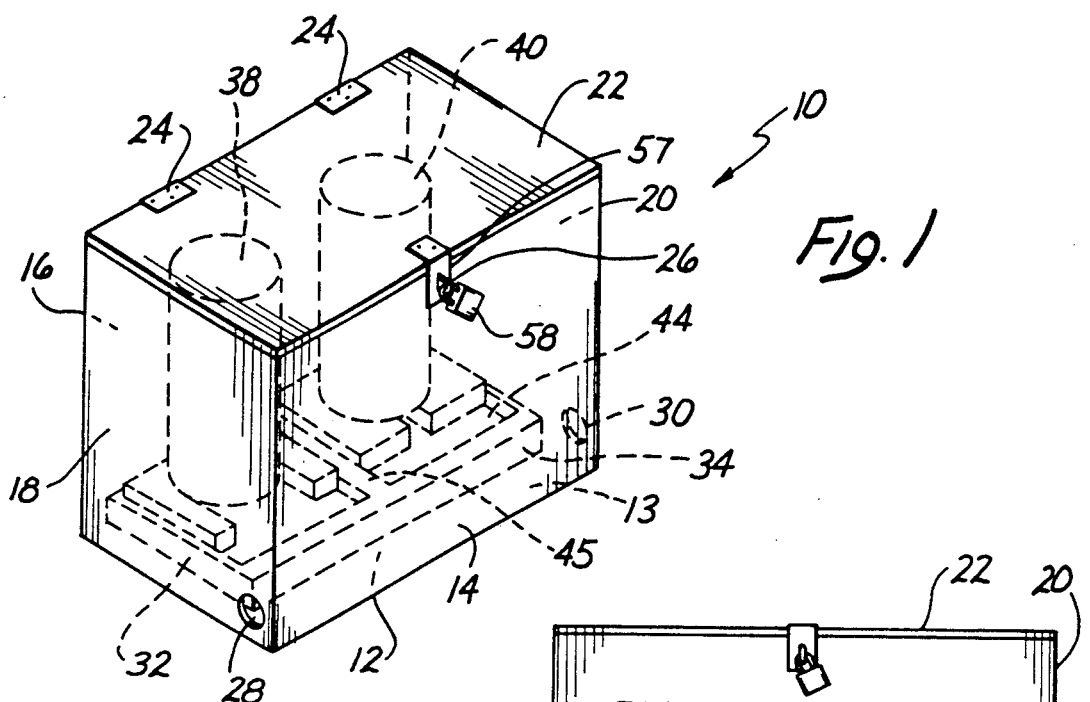
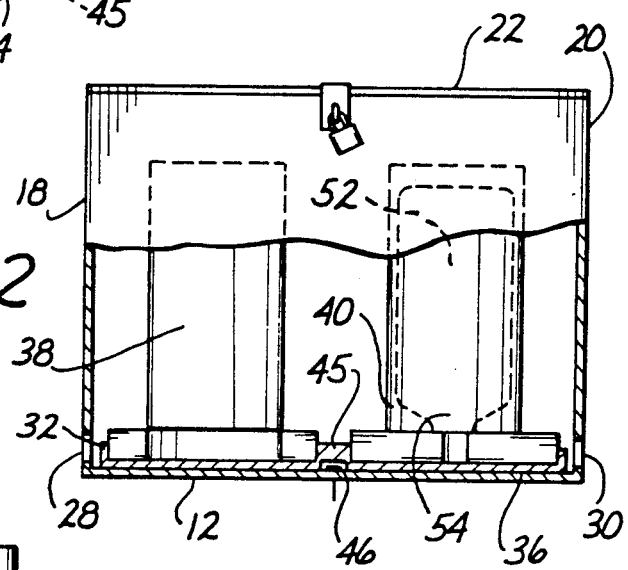
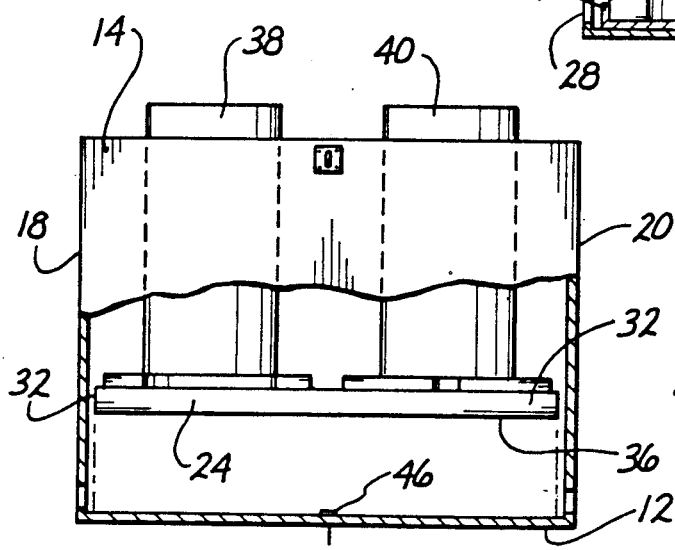

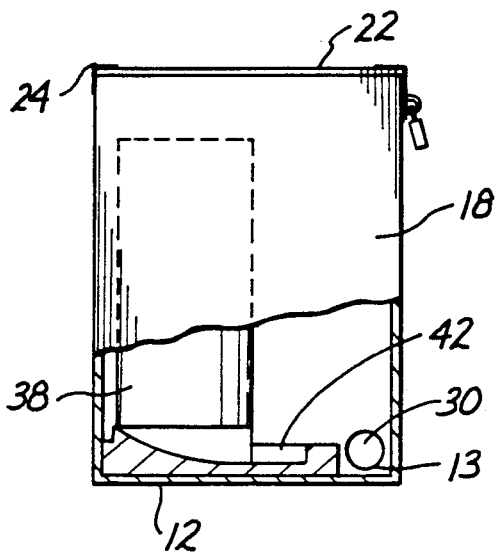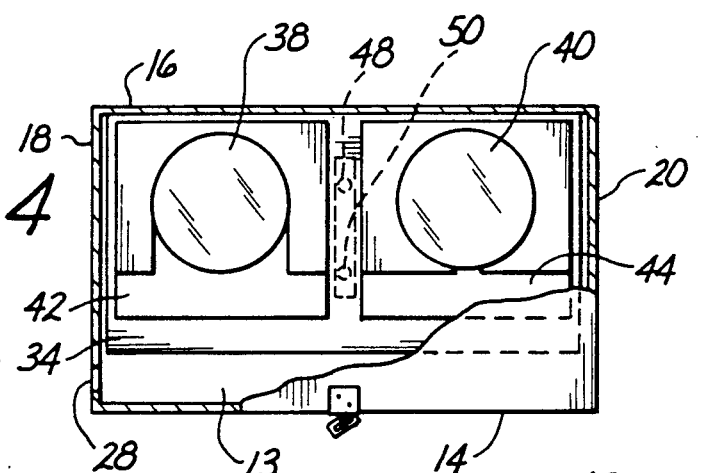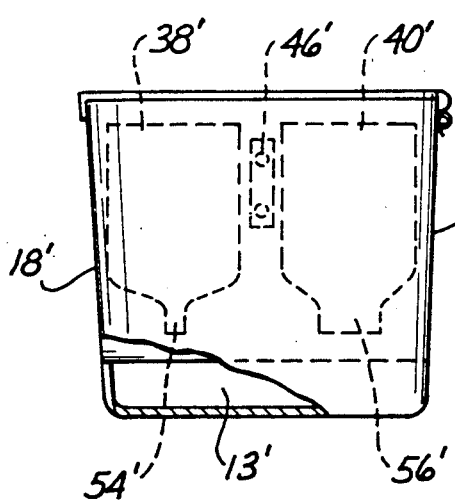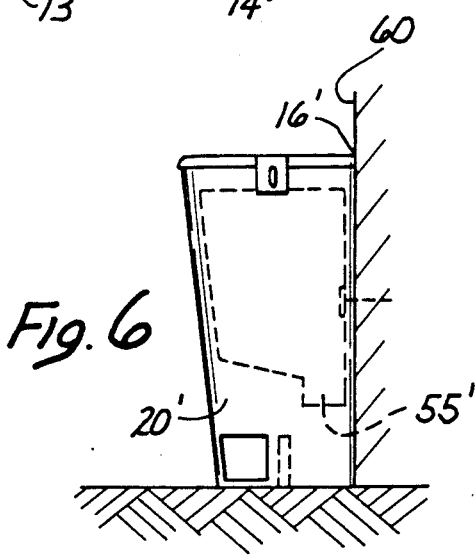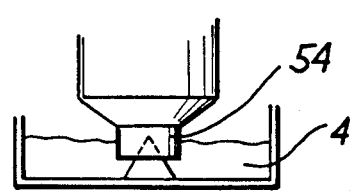

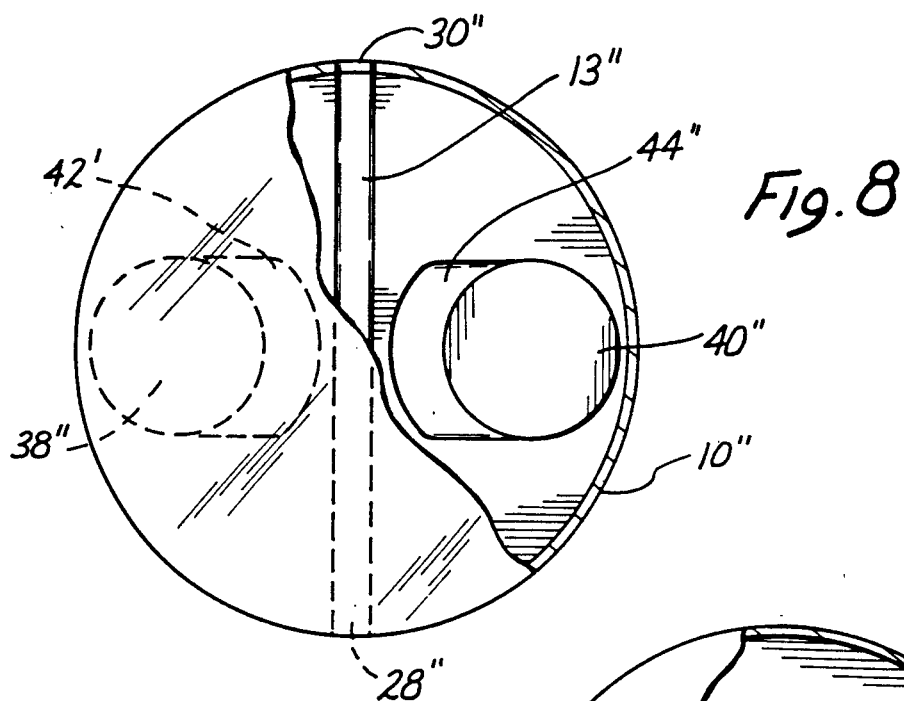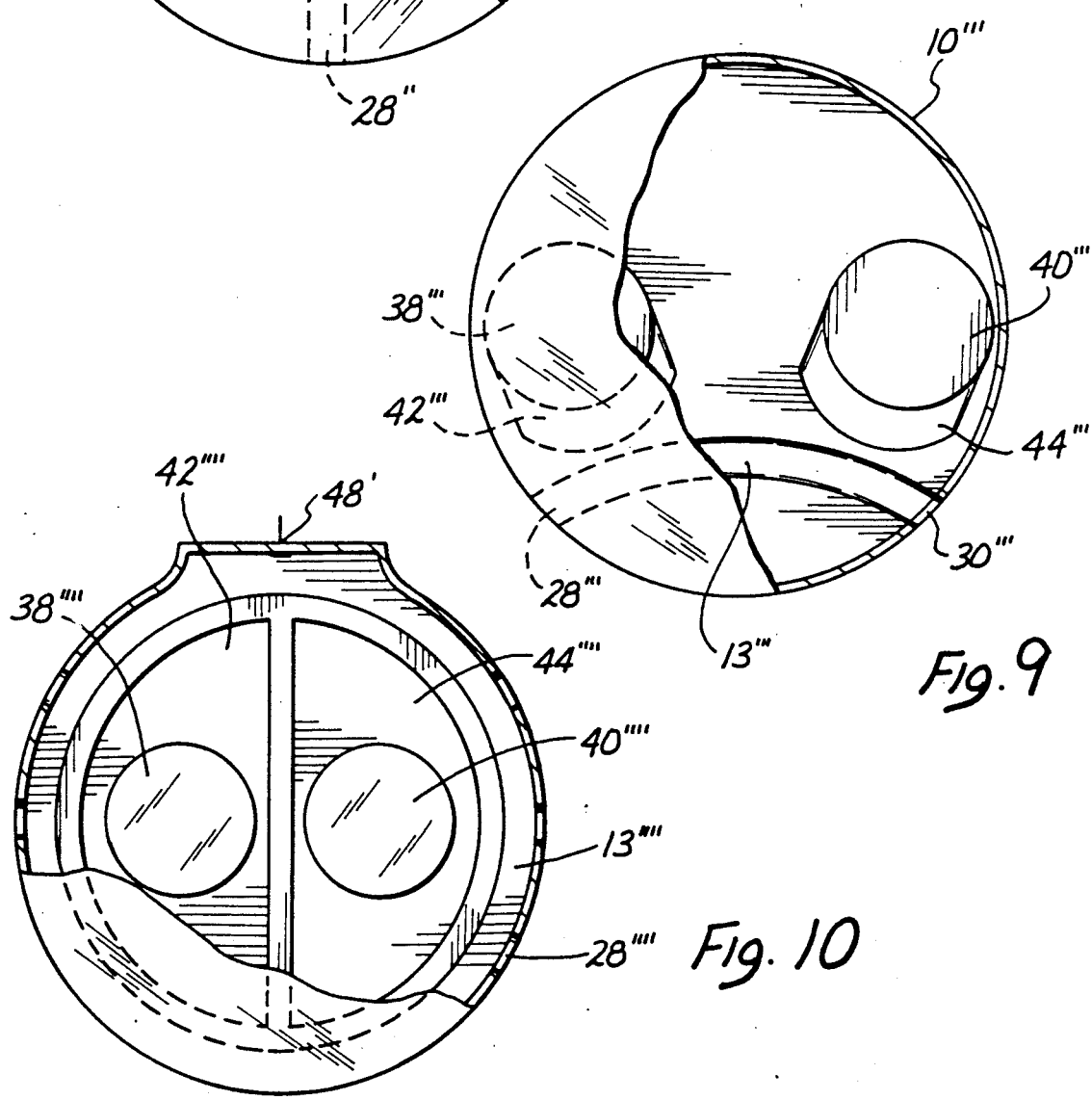

RODENT POISON DISPENSER

This is a file wrapper continuation of application Ser. No. 07/496,425 filed Mar. 20, 1990, now abandoned.

FIELD OF THE INVENTION

This invention relates to the field of devices designed to exterminate rodents by poisoning.

DESCRIPTION OF THE PRIOR ART

Human society has been confronted with the problem of controlling the population of rodents, such as rats and mice, from time immemorial. In forests and fields, such control is naturally effected by predators, such as owls, hawks, and members of the cat family. However, in urban environments, these natural predators are either not present in sufficient numbers, or are unable to attack increasing numbers of rodents which may thrive in man made structures, trash and garbage.

While human beings often kill rodents with some type of weapon, exterminating rodents in this manner is neither easy nor effective since the rodents tend to sortie more frequently at night and are, therefore, not easily found and slain.

For many years, therefore, efforts have been made to poison rodents, but poisons may not be left around just anywhere since they may also be picked up and eaten by domestic animals and even small children. For many years, therefore, poisons have only been dispensed generally by means of some type of tamper resistant, such as a locked container, early examples of which are illustrated and described in U.S. Pat. Nos. 886,934, 1,036,610 and 1,321,360.

In most prior art devices, the poison utilized is in the form of some type of a dry food and this food is provided for access by the rodent in one or more trays or receptacles which are disposed adjacent a passageway extending through a closed housing. The types of such housings which appear to be most currently used at this time are those which are illustrated and described in U.S. Pat. Nos. 4,026,464 and 4,658,536. Earlier types of rodent poison feeders may be seen in U.S. Pat. Nos. 2,944,364, 2,964,871, 3,025,630, 3,122,857, 3,303,600 and 3,517,454.

While, as previously mentioned, poison feeders for rodents have usually been designed to dispense some type of a dry food, the device of U.S. Pat. No. 3,517,454 provides a dispenser for what is called a "fluid dry solid", and U.S. Pat. No. 3,122,857 discloses a device which may be adapted to dispense either a dry poison food or a liquid. U.S. Pat. No. 2,944,364 discloses a feeder for dry food, but shows in phantom in FIG. 2 what is briefly referred to in Column 3, lines 58–60, as "a water feeder" "such as a chick feeder". There is, however, no teaching in this latter patent of employing the "chick feeder" to dispense a liquid poison.

It is well recognized in the art that the attractiveness of various food poisons to rodents may vary considerably. In some instances, rodents may actually prefer and will voraciously eat a dry food. In other instances, however, they may prefer some type of liquid and, in many instances, may be attracted to sample some of both types of poisoned offerings. None of the prior art devices has been found to provide poison feeders which contain and make available both liquid and poisoned foods.

Another problem with prior art devices is that they may be either knocked over inadvertently, or may be picked up and carried off, either by thieves or simply by curious children. This presents a particular hazard where it may be desirable to set up rodent poison feeders in or near areas where people may be expected to pass, such as shopping malls, alleys or warehouses. It is quite desirable, therefore, that provision be made for securing rodent feeding devices in such a manner that they cannot be easily knocked over or picked up and removed. They should, of course, be locked to prevent access to the insides of the feeders by persons other than those having a proper key and charged with the responsibility of servicing the feeders.

SUMMARY OF THE INVENTION

The present invention is directed to providing a feeder of rat poison which may be anchored by bolting or other means, either to a cement or wooden floor or to a wall, fence post or other structure. The feeder provides a locked housing having a pair of openings in opposite side walls to afford the rodent a passageway through the housing, along which passageway and easily accessible therefrom, are two separate feeder stations, one in the form of a tray into which a dry food may be fed by gravity from a hopper, and the other, in the form of a well or small basin into which is fed from a container and maintained at a predetermined level, a liquid poison attractive to the rodent. The rodent is thus offered in a convenient readily accessible form, its three basic requirements, namely a convenient passage which may serve as a feeding shelter, food in a dry form, and liquid, both of which latter contain sufficient poison to effectively cause the rodent's prompt demise. Thus, rodents which are more hungry than thirsty may principally feed on the dry food and may or may not sample the liquid poison, whereas rodents which may be more thirsty than hungry, will drink from the poisoned well. Whether the rodent samples the dry food or the liquid, its demise should thereafter occur within a brief period.

The form of the present invention lends itself to large scale rodent extermination in that the housings with their poison dispensers may be secured on walls, fences or along floors. In one embodiment of the invention, the depth of the housing is minimized by disposing the dry food and liquid dispensers above the passageway and providing communication with the feeding areas, either off-center or at an angle. Such a design lends itself particularly to securing the housings against walls with a minimum amount of projection from the latter. A servicing organization may dispose a number of these rodent feeders around in a given area and service them on a scheduled basis to replenish the poison liquid and dry bait food.

Overall, the present invention offers important advantages over the current state-of-the-art devices.

BRIEF DESCRIPTION OF THE DRAWINGS

FIG. 1 is perspective view of the preferred embodiment of the invention.

FIG. 2 is a front elevation of the embodiment of FIG. 1.

FIG. 2A is a partial front elevation showing the top removed and the feed tray elevated.

FIG. 3 is a side elevation of the embodiment of FIG. 1.

FIG. 4 is a plan view of the embodiment of FIG. 1.

FIG. 5 is a front elevation of another embodiment of the invention.

FIG. 6 is a side elevation of the embodiment of FIG. 5.

FIG. 7 is a detail of the lower portion of a liquid feeder.

FIGS. 8, 9 and 10 are sketches in plan view of alternative layouts of the invention to that shown in FIG. 4 in greater detail.

DESCRIPTION OF THE PREFERRED EMBODIMENT

Referring to the drawings, in its preferred form the invention may best be seen in the overall perspective view of FIG. 1 and comprises a box 10 formed of a bottom or floor 12, front and back walls 14 and 16, and side walls 18 and 20 extending upwardly from the bottom or floor 12. A cover 22 may be hinged at 24 on the upper edge of the rear wall 16 and securable to the upper edge of the front wall 14 by locking means 26. Each of the side walls 18 and 20 is provided with an opening 28, 30, respectively, adjacent the forward wall 14 and close to the bottom or floor 12, thereby affording a passageway 13 across the floor 12 between the openings 28 and 30 and adjacent the front wall 14.

Within the rectangular housing thus formed by the side walls 18, 20 and front and back walls 14 and 16 may be disposed rearwardly of the openings 28 and 30 a removable tray 32, best shown in FIGS. 2, 2A, 3 and 4. This tray 32 desirably includes a front wall 34 which arises from a bottom member 36, the latter extending rearwardly to abut the rear wall 16.

The tray 32 may also provide for supporting on its floor 36, but spaced from each other, a pair of cylindrical containers 38 and 40. One of these cylindrical containers 38 may be designed to act as a hopper to feed dry bait into a trough 42 formed behind the front wall 34 and in front of the lower end of the container 38, and the other cylinder 40 may have a bottle 52 to provide for the dispensing of liquid bait into a separate, laterally adjacent trough 44. Below the center 45 of the tray 32, a steel plate 46 is placed on the bottom 12 of the housing 10 and such plate is orificed at 48 and 50 to register with holes (not shown) in the bottom 12. Thereby the housing 10 may be secured to a floor or cement deck (not shown) by bolting or other anchoring means (also not shown) while the tray 32 may be raised from the floor 12 for servicing, as illustrated in FIG. 2A.

In use the cylinder 38 may be filled with dry bait and is disposed within the tray 32 with an opening, not shown, to allow the bait to drop into the bait trough 42 and, upon removal of bait from that trough, to refill the trough 42 by gravity.

Similarly, the cylinder 40 desirably may house a bottle 52 containing liquid bait which may tend to exude through the neck 54 of the bottle into the trough 44 or a well or other receptacle (not shown) which would be disposed directly below the neck 54 of the bottle and be in communication with the trough 44 as illustrated in FIG. 7.

The net result is that the bait trough 42 presents an accessible quantity of dry poison bait food in the trough 42 just over the low wall 34 adjacent the passageway 13, while further down the latter, the bait trough 44 presents a liquid poison bait. Thus, a rodent entering either of the openings 28 or 30 and moving along the passageway will have easy access to either dry bait, if the rodent is principally hungry, or liquid poison bait, if the rodent is thirsty, or both. In any event, after partaking of one or the other, or both, of the poison baits, depending upon the strength of the poison, the rodent should expire shortly thereafter, wherever it happens to be.

As previously mentioned, the housing 10 is intended to be secured to the floor or ground surface by some kind by bolting or other means through the plate 46 in the bottom 12. To prevent unwanted or unauthorized access to the inside of the housing 10, the cover 22, with hinges 24, 26 securing it to the upper edge of the rear wall 16, may be secured by any locking device, such as a padlock 58 through a staple 59 projecting through the hasp 60.

FIGS. 5 and 6 illustrate an embodiment of the invention which is specifically designed to be secured to, or at least disposed against, a wall and to project therefrom for a minimum distance, as may best be seen from FIG. 6. In this second embodiment, the depth of the side walls 18' and 20' may be but a fraction of the depth of the side walls 18 and 20 of the FIGS. 1 through 4 embodiment. Because of this greatly reduced depth, it may become desirable to dispose the bait containers 38' and 40' at least partially above the passageway 13' with their discharging spouts 54', 55' being off-center and canted toward the rear wall 16' to discharge into a trough 42' or 44' located adjacent the rear wall 16'. In this FIG. 5 and FIG. 6 embodiment, a plate 46' may be secured inside the rear wall 16', thereby to enable the housing to be bolted to a wall, fence post or other vertical structure 60, preferably so that it also rests on the ground as shown in FIG. 5. Provision could, however, be made in the same manner as shown in FIG. 4 to have it bolted to a floor or other ground surface.

While the embodiments of the invention shown in FIGS. 1-6, have employed rectangular housings, the concept of the invention could be practiced with many different shaped housings, as, for example, the cylindrical housings shown in FIGS. 8, 9 and 10.

In FIG. 8, a diametrically extending path 13" runs between openings 28" and 30" past troughs 42" and 44" which are filled respectively by a dry food dispenser 38" and a liquid dispenser 40" of the types more fully described in connection with the FIGS. 1-4 embodiments.

FIG. 9 shows a similar embodiment to that of FIG. 8, but the access path 13'" is arcuate and the troughs 38'" and 40'" are appropriately placed for convenient access from the path 13'".

As may be seen from FIG. 10, the dispensers 38"" and 40"" and their respective troughs 42"" and 44"" are centrally disposed and the path 13"" encircles them with a plurality of entrances 28"".

The invention, thus, may be practiced in many forms.

The invention as thus described not only will be found to be most effective in killing rodents, but it may be safely and conveniently set up at a number of locations, even in areas where people pass by, such as shopping malls or alleys, or attached to fence posts in field areas. It also lends itself to easy servicing in that the service operator only has to unlock the top 22 of the housing 10, lift up the removable tray 32 to inspect the tray and the bait containers 38, 40 to see if they are full and still presenting their respective contents in their troughs 42, 44; and, if so, to let the tray 32 back down onto the floor 12 of the housing, close the cover 22, and relock the same. Such servicing can probably be accomplished in a minute or two, so that a large number of such devices disposed along a preselected route may be readily serviced on a scheduled time basis.

It may be seen, therefore, that the present invention offers many advantages over prior art devices.

What is claimed is:

1. A method of poisoning a rodent which comprises:

providing a housing defining an enclosed area having at least two access openings for a rodent and a passageway extending between said openings through which a rodent may move between the first and second access openings;

providing a first feeder and a second feeder disposed within said enclosed area adjacent to said passageway and accessible by a rodent moving through said passageway, one of said feeders being in the form of a trough to contain dry food, said trough being provided with a hopper which will feed further dry food to the trough upon removal of a predetermined quantity of the food from said trough, and the second feeder comprising a trough adapted to hold a liquid, the last said trough being provided with liquid feeding means whereby, upon a lowering of the level of the liquid in the second trough below a predetermined level, further liquid is fed into the trough to replenish the removed liquid to said predetermined level.

providing in the first trough a dry food poison and providing in the second trough a liquid poison at said predetermined level;

whereby the rodent, upon entering one of said access openings and moving through the passageway to the other access opening may be expected to both eat the dry food poison and drink the liquid poison, with the result that, upon leaving the enclosed area through one of said access openings, the rodent may be expected to expire quickly through the combined effects of the two poisons.

* * * * *